US012527710B1

(12) United States Patent
Stine

(10) Patent No.: US 12,527,710 B1
(45) Date of Patent: Jan. 20, 2026

(54) NECK MOVEMENT SUPPORT DEVICE, SYSTEM AND METHODS

(71) Applicant: Joseph P. Stine, Orlando, FL (US)

(72) Inventor: Joseph P. Stine, Orlando, FL (US)

( * ) Notice: Subject to any disclaimer, the term of this patent is extended or adjusted under 35 U.S.C. 154(b) by 1101 days.

(21) Appl. No.: 17/527,206

(22) Filed: Nov. 16, 2021

(51) Int. Cl.

| | |
|---|---|
| ***A61H 1/02*** | (2006.01) |
| ***A61G 13/00*** | (2006.01) |
| ***A61G 13/06*** | (2006.01) |
| ***A61G 13/12*** | (2006.01) |

(52) U.S. Cl.

CPC ......... *A61H 1/0296* (2013.01); *A61G 13/009* (2013.01); *A61G 13/06* (2013.01); *A61G 13/121* (2013.01); *A61G 2200/327* (2013.01); *A61G 2203/36* (2013.01); *A61H 2201/1253* (2013.01); *A61H 2201/1607* (2013.01); *A61H 2201/1671* (2013.01)

(58) Field of Classification Search

CPC ................ A61G 13/12; A61G 13/1295; A61G 13/1205; A61G 13/121; A61G 13/122; A61G 13/128; A61G 13/129; A61G 13/1285; A61G 13/0054; A61G 13/0072; A61G 13/009; A61F 5/3707; A61F 5/0102; A61H 1/0296; A61H 1/0292; A61H 1/0222

See application file for complete search history.

(56) References Cited

U.S. PATENT DOCUMENTS

| | | | |
|---|---|---|---|
| 1,233,496 | A | 7/1917 | Nichols |
| 2,791,999 | A | 5/1957 | Bustamante |
| 2,819,132 | A | 1/1958 | Rock |
| 3,238,936 | A | 3/1966 | Siedentop |
| 4,278,249 | A | 7/1981 | Forrest |
| 4,373,222 | A | 2/1983 | Wolfe |
| 4,655,450 | A | 4/1987 | Rogers, Jr. et al. |
| 4,660,549 | A | 4/1987 | Kowalski et al. |
| 4,768,779 | A | 9/1988 | Oehman, Jr. et al. |
| 4,850,343 | A | 7/1989 | Scott |
| 5,039,245 | A | 8/1991 | Hansen |
| 5,116,359 | A | 5/1992 | Moore |
| 5,192,306 | A | 3/1993 | Scott |
| 5,336,138 | A | 8/1994 | Arjawat |

(Continued)

*Primary Examiner* — Joseph D. Boecker
*Assistant Examiner* — Brian T Khong
(74) *Attorney, Agent, or Firm* — ALLEN, DYER, DOPPELT + GILCHRIST, P.A.

(57) ABSTRACT

A neck movement support device comprises a stationary member, a movable member, a handle and a head harness. The movable member is mounted to the stationary member at a first pivot point, the movable member being rotatable relative to the stationary member about the first pivot point, the first pivot point defining an anteroposterior neck movement axis. The handle is connected to the movable member by a pair of four-bar linkages so as to approximate rotation about a second pivot point defining a mediolateral neck movement axis perpendicular to and intersecting the anteroposterior neck movement axis. The head harness is connected to the handle at a third pivot point, the head harness being rotatable relative to the handle about the third pivot point, the third pivot point defining a craniocaudal neck movement axis perpendicular to both the anteroposterior and mediolateral neck movement axes and sharing a mutual intersection therewith.

26 Claims, 5 Drawing Sheets

(56) References Cited

U.S. PATENT DOCUMENTS

| | | | | |
|---|---|---|---|---|
| 5,359,836 | A | 11/1994 | Zeuner et al. | |
| 5,569,175 | A | 10/1996 | Chitwood | |
| 6,213,558 | B1 | 4/2001 | Axelson | |
| 6,277,141 | B1 | 8/2001 | Lake | |
| 6,436,126 | B1 | 8/2002 | McAfee | |
| 6,599,257 | B2 | 7/2003 | Al-Obaidi et al. | |
| 6,638,299 | B2 | 10/2003 | Cox | |
| 7,189,214 | B1 | 3/2007 | Saunders | |
| 7,601,132 | B2 | 10/2009 | Nichols et al. | |
| 8,485,195 | B2 | 7/2013 | River et al. | |
| 8,529,480 | B2 | 9/2013 | Dicerbo et al. | |
| 10,004,626 | B1 * | 6/2018 | Stine .................... | A61H 1/0296 |
| 2002/0170115 | A1 | 11/2002 | Borders et al. | |
| 2003/0055456 | A1 * | 3/2003 | Cox ..................... | A61H 1/0222<br>606/242 |
| 2009/0204039 | A1 | 8/2009 | Elan | |
| 2009/0272385 | A1 | 11/2009 | River | |
| 2013/0019877 | A1 | 1/2013 | Sklar | |

* cited by examiner

NECK MOVEMENT SUPPORT DEVICE, SYSTEM AND METHODS

FIELD OF THE INVENTION

The present invention relates to neck movement support devices, and more particularly, to devices for therapeutic diagnosis and treatment of the joints of the neck and related muscles.

BACKGROUND OF THE INVENTION

The term "proprioceptive neuromuscular facilitation" (PNF) refers to stretching techniques used in a clinical environment to enhance a patient's both active and passive ranges of motion. Generally, an active PNF stretch involves a shortening contraction of the opposing muscle to place the target muscle on stretch, followed by an isometric contraction of the target muscle.

In the case of manual PNF neck therapy, the patient lies on a table with the head extending beyond one end of the table, while the therapist holds the sides of the head and moves the head to a desired position to stretch the target muscle group. Progress is determined by the improved angle of motion of the neck from its normal position. The angle is either estimated or measured using a protractor. Because both hands of the therapist are required during the stretch and hold, a protractor is difficult to use, resulting in inaccurate measurement. The therapist may have a difficult time holding the head in a fixed position against the force applied by the patient's head. Also, the force needed to hold the patient's head is fatiguing for the therapist.

The present inventor developed a neck movement support device that is disclosed in U.S. Pat. No. 10,004,626, issued on Jun. 26, 2018 (the contents of which are herein incorporated by reference in their entirety). This device obviated the need for the therapist to hold the patient's head, which was instead placed in a head harness supported relative to the table by movement mechanisms that allowed rotation about the anteroposterior, mediolateral and craniocaudal neck movement axes. In addition to easing the strain on the therapist, this device allowed much more reliable measurement of the angle of motion about each of the neck movement axes. While very effective, structural constraints of the movement mechanisms prevented the mediolateral neck movement axis of the device from intersecting at the cervical vertebra C7 with the anteroposterior and craniocaudal neck movement axes.

SUMMARY OF THE INVENTION

In view of the foregoing, it is an object of the present invention to provide an improved neck movement support device and related systems and methods. According to an embodiment of the present invention, a neck movement support device comprises a stationary member, a movable member, a handle and a head harness. The movable member is mounted to the stationary member at a first pivot point, the movable member being rotatable relative to the stationary member about the first pivot point, the first pivot point defining an anteroposterior neck movement axis. The handle is connected to the movable member by a pair of four-bar linkages so as to approximate rotation about a second pivot point defining a mediolateral neck movement axis perpendicular to and intersecting the anteroposterior neck movement axis. The head harness is connected to the handle at a third pivot point, the head harness being rotatable relative to the handle about the third pivot point, the third pivot point defining a craniocaudal neck movement axis perpendicular to both the anteroposterior and mediolateral neck movement axes and sharing a mutual intersection therewith. With the stationary member positioned adjacent a treatment table holding a supine user, a head of the user is securable in the head harness so as to constrain the head to move or remain stationary along with the head harness about the anteroposterior, mediolateral and craniocaudal neck movement axes defined by the device, with the mutual intersection being located at cervical vertebra C7 of the user.

An aspect of the present invention is more particularly directed to a system and method for achieving PNF stretching of the neck in one plane of motion while other planes of motion are held in a mechanically locked position, until such time as the therapist releases the associated locking mechanism. To this end, the system is provided with a harness for holding the patient's head adjacent and over one end of a therapy table, with the harness fitted to the handle that is rotatable side to side by the therapist. The harness supported by the handle can also be rotatable about other axes to achieve complete manipulation of the head. Means are provided for measuring the angular displacement of the patient's head relative to a reference. A hydraulic cylinder arrangement is attached between the fixed member and the moveable member to lock the moveable member in a fixed position about the anteroposterior axis. A two hydraulic cylinders arrangement is attached between the movable member and the handle to lock the handle in a fixed position about the mediolateral axis. These locks hold the patient's head in a desired position so that the PNF stretching activities can proceed. The system includes restrictive means to insure that, while the patient is free to exercise the neck in one plane of motion, other planes of motion are held in a locked position.

Advantageously, the PNF system is under the control of the therapist, with the therapist's hands being replaced with the head harness. The therapist moves the system to a desired location and locks the head into that initial stretched position. When the patient applies force against the head harness, the resistance to that force is supplied by the head harness replacing the therapist's hands. The procedure of stretching, followed by isometric force from the patient and then relaxation is repeated until no further improvement is reached. The range of motion can be accurately measured by the system. After the PNF therapy is completed and improved range of motion is achieved, the stops in one plane of motion can be freed and the patient can actively exercise the joint through the improved range of motion.

These and other objects, aspects and advantages of the present invention will be better appreciated in view of the drawings and following detailed description of preferred embodiments.

DETAILED DESCRIPTION OF PREFERRED EMBODIMENTS

Figure 1:
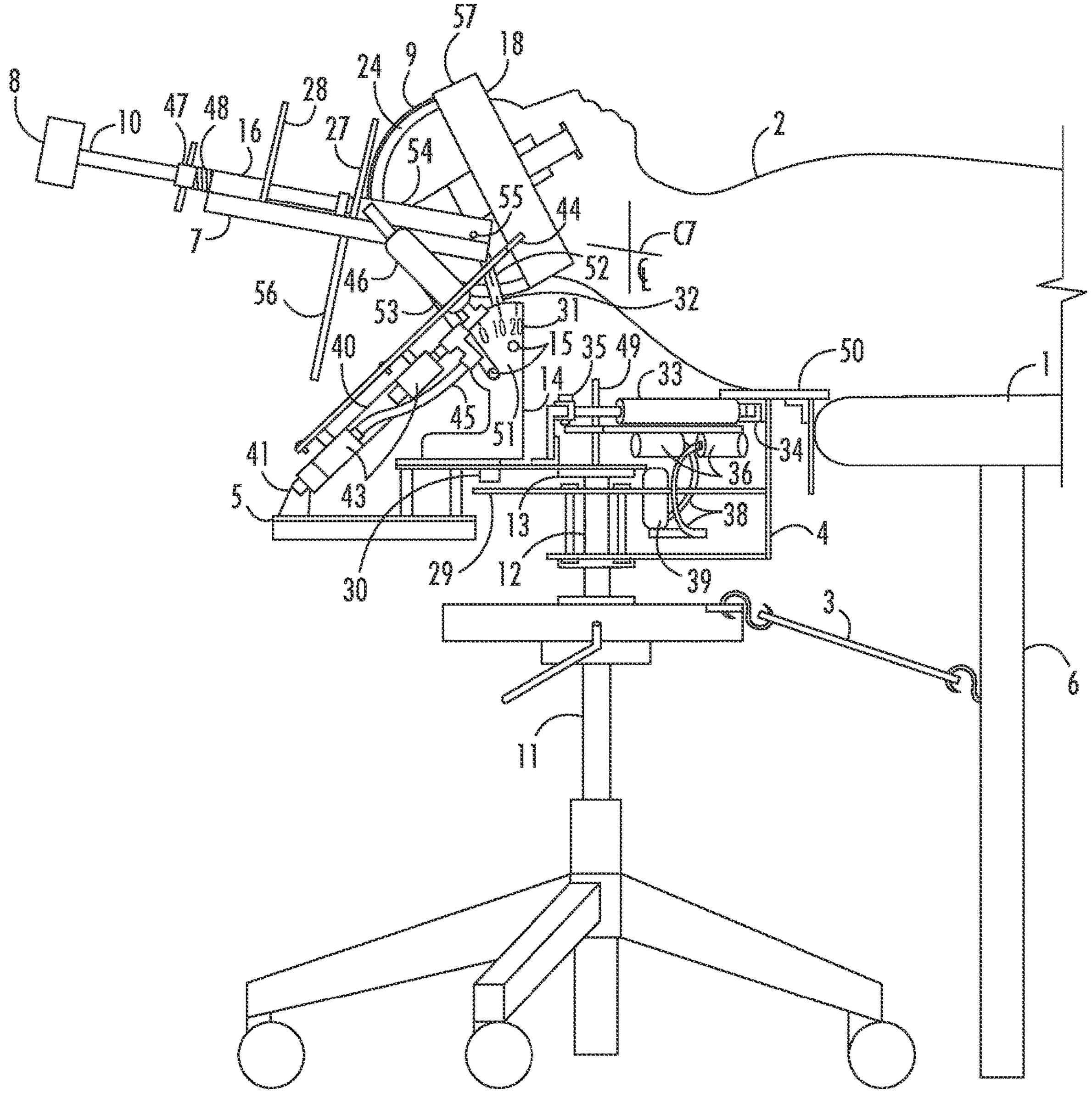
FIG. 1 is a right side elevation view of a neck movement support device, according to an embodiment of the present invention.

The PNF stretching system and methods of this invention will now be described more fully with reference to the drawings in which a preferred embodiment of the invention for use in carrying out PNF stretching of the neck is shown and described. It will of course be understood by those skilled in the art that the invention may be embodied in different forms and should not be construed as limited to the illustrated embodiment described below and shown in the drawings.

Figure 2:
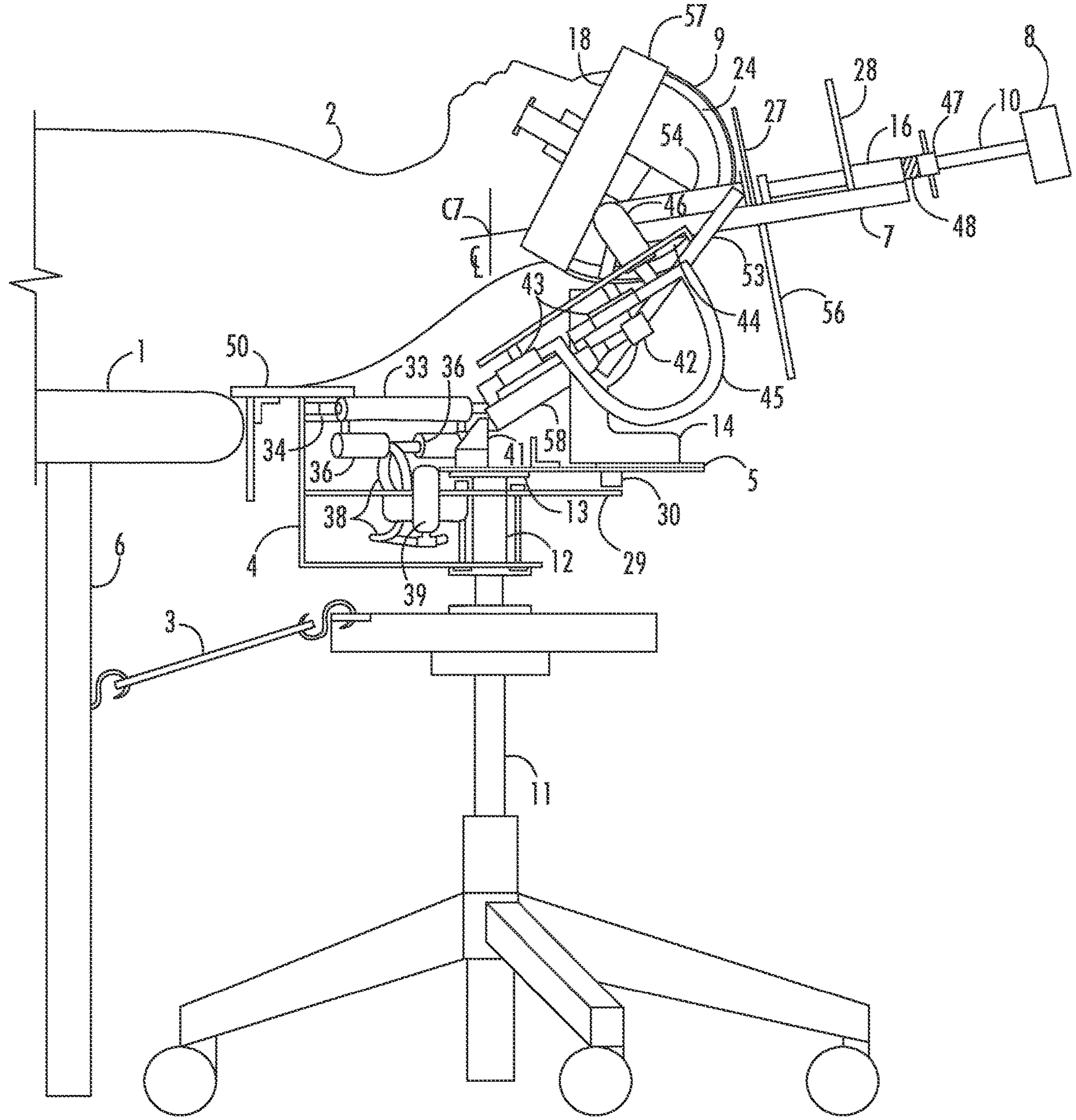
FIG. 2 is a left side elevation view of the device of FIG. 1.
Figure 3:
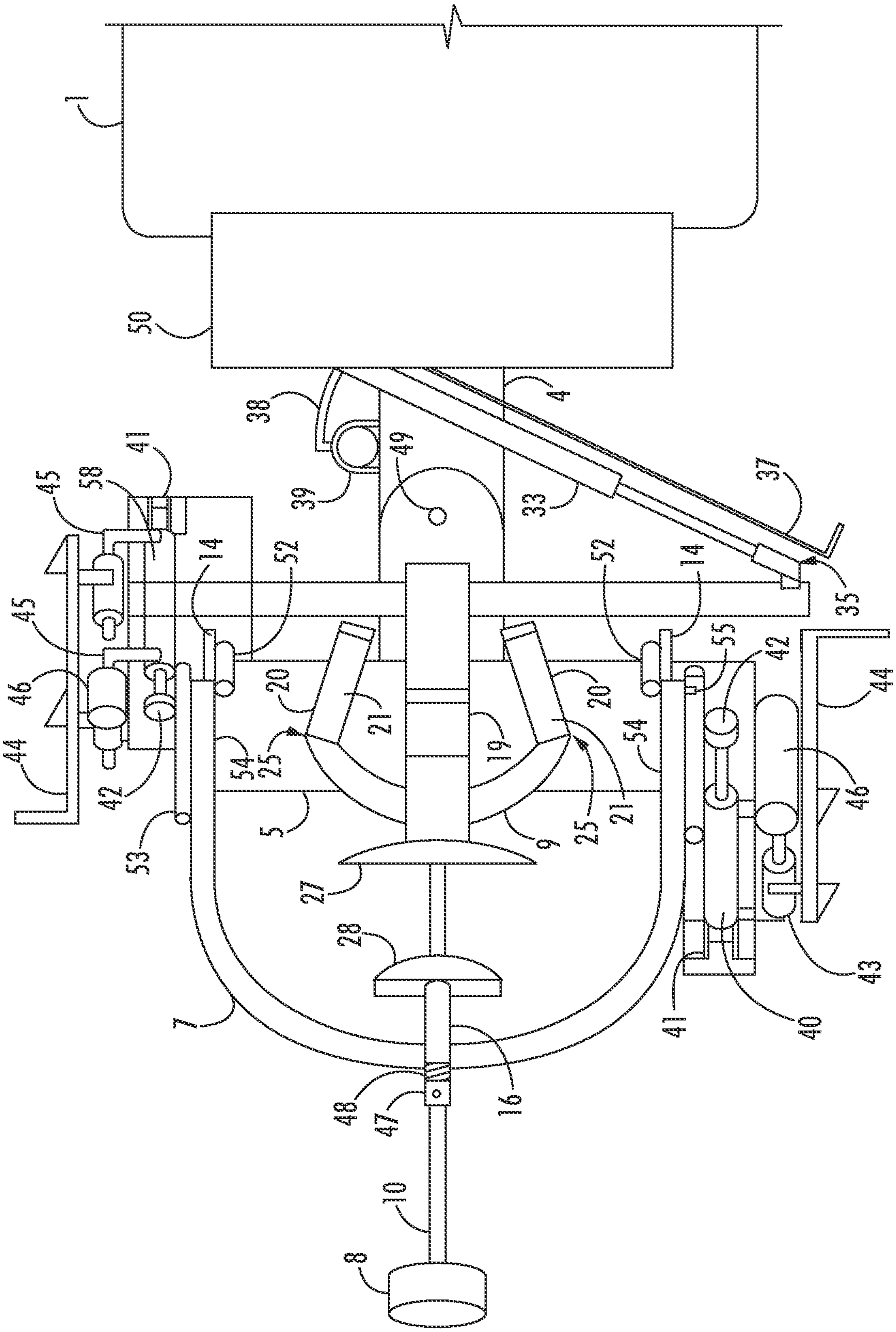
FIG. 3 is a plan view of the device of FIG. 1.

FIGS. 1, 2, and 3 illustrate the overall view of the device incorporated into the PNF system of this invention. The device is attached to a treatment table (1) by placing a stationary member (4) against the treatment table (1) and securing an adjustable support on wheels (11) to table legs (6) by means of elastic straps (3). The device is mounted on the adjustable support on wheels (11) for mobility and to adjust the height of the back rest (50) to match the height of the treatment table (1). The patient (2) lies on the treatment table (1) with the head beyond the end of the table so that the patient's (2) shoulders are supported by the back rest (50). The weight of the patient (2) on the back rest (50) and the elastic straps (3) stabilize movement of the adjustable support on wheels (11).

Now noting FIGS. 1, 2, and 3, the stationary member (4) is supported from the floor by the adjustable support on wheels (11) and attached thereto by a shaft and bearing assembly (12) concentric with the central shaft of the adjustable support on wheels (11). The shaft and bearing assembly (12) allows the movable member (5) to turn in the horizontal plane on its shaft in the bearing which is part of the stationary member (4). The shaft is attached to a shaft bracket (13) mounted on the movable member (5). The centerline of the shaft and pivot axis of the bearing assembly (12) corresponds with the patient's (2) neck vertebra (C7), which is the approximate bending point of the neck about the anteroposterior neck movement axis. The movable member (5) can turn approximately 45 degrees in either direction before the movable member (5) is stopped by the back rest (50).

Two handle supports (14) are mounted on the movable member (5), one for each end of a handle (7) which is U-shaped. Each side of the handle (7) is attached to the handle supports (14) by means of two synchronized four-bar linkages. Each four-bar linkage includes a short link (52) and a long link (53), while the fixed link (51) of each four-bar linkage is formed integrally in the a respective handle support (14). The floating links (54) are formed integrally in opposite sides of the handle (7). The fixed links (51) are aligned in a plane that intersects the cervical vertebra (C7) at 45 degrees below the mediolateral neck movement axis passing through cervical vertebra (C7). Each short link (52) is attached by a shoulder screw (15) at the end of the respective fixed link (51) closest to cervical vertebra (C7). Each of long links (53) is attached by a respective shoulder screw (15) at the end of the respective fixed link (51) farthest from the cervical vertebra (C7). Each of the short links (52) is attached by a respective shoulder screw to the respective floating link (54) at its end closest to the cervical vertebra (C7). Each of the long links (53) is attached by a respective shoulder screw to the floating link (54) at its end farthest from the cervical vertebra (C7).

Figure 5:
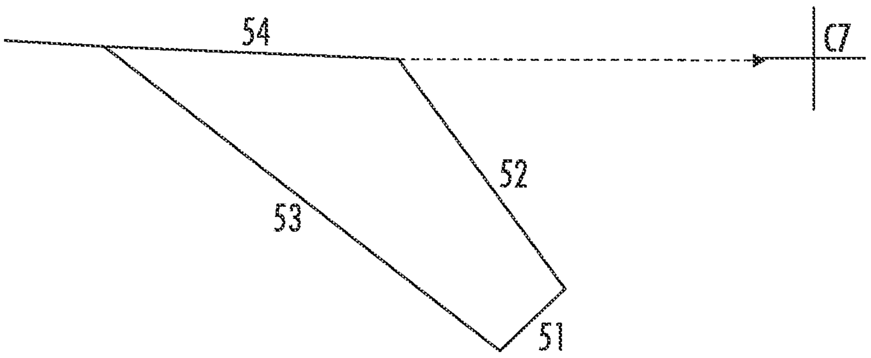
FIG. 5 is a schematic diagram of a four-bar linkage of the device of FIG. 1, at a zero (0) degree angle about the mediolateral neck movement axis relative to the C7 vertebra.
Figure 6:
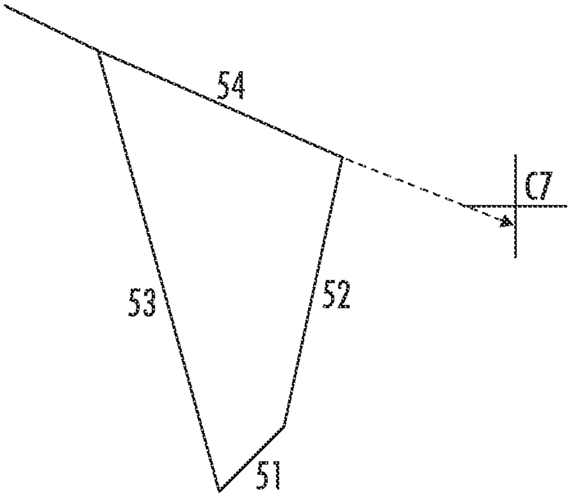
FIG. 6 is a schematic of the four-bar linkage of FIG. 5, at a positive 30 degree angle about the mediolateral neck movement axis relative to the C7 vertebra.
Figure 7:
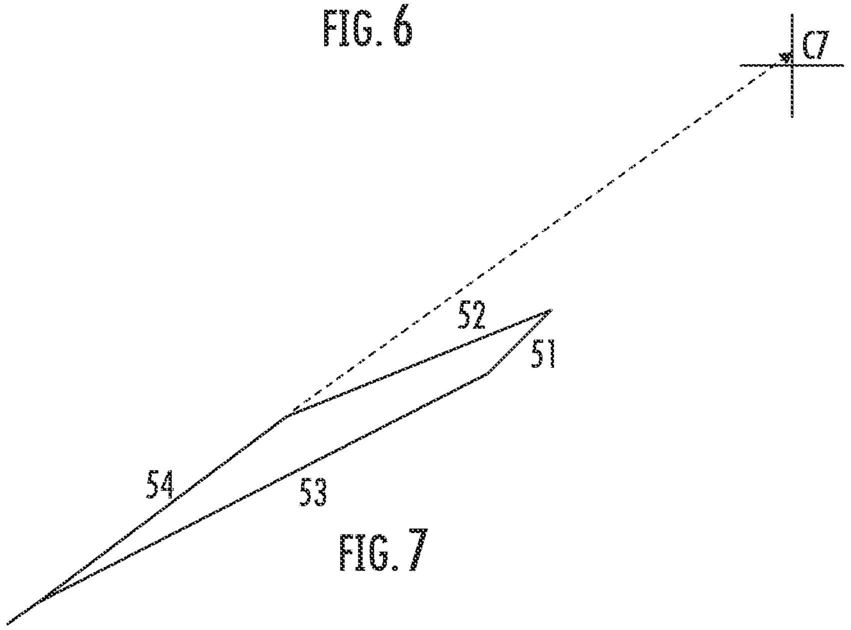
FIG. 7 is a schematic of four-bar linkage in FIG. 5, at negative 35 degree angle about the mediolateral neck movement axis relative to the C7 vertebra.

The incorporation of the floating links (54) of the four-bar linkages into the sides of the handle (7) allow the handle (7) to closely approximate pivotal movement in the vertical plane about the mediolateral neck movement axis (into and out of the page at (C7) in FIGS. 1 and 2. This is schematically illustrated in FIGS. 5, 6 and 7, with the mediolateral neck movement axis going into and out of the page at (C7). The head of the patient (2) would be the left of (C7), with the patient oriented as in FIG. 1. With the handle (7) in a horizontal position at zero degrees as indicated on the vertical angular gauge (31), the plane (P) in which the floating links (54) lie points directly to the cervical vertebra (C7), as shown in FIG. 5. When the handle (7) is raised, the plane (P) points only slightly below the cervical vertebra (C7), as shown in FIG. 6. When the handle (7) is lowered, the plane (P) points only slightly above the cervical vertebra (C7), as shown in FIG. 7.

The plane (P) of the floating links (54) passes close enough to the cervical vertebra (C7) throughout the range of motion of the handle (7) that its motion approximates rotation about a pivot axis, which pivot axis is the mediolateral axis passing through the cervical vertebra (C7). As used herein, the pivot axis of the handle "approximates" rotation about this pivot axis if the plane of the floating links deviates no more than 0.589 inches from the intersection of the anteroposterior and craniocaudal neck movement axes throughout the range of handle motion delimited by the device. In a preferred embodiment, maximum deviation is at the upper end point of the range of motion of the floating links, such that less deviation occurs through the medial portion of the range of motion. The selection of lengths of the four links should be such that the sum of the lengths of the short and floating links equals the sum of the lengths of the fixed and long links.

In a preferred embodiment, the handle (7) can move through a range of 75 degrees about the mediolateral neck movement axis, with that range allocated to 30 degrees above horizontal and 45 degrees below horizontal. A different range of motion is achievable by changing the relative lengths of the links of the four-bar linkage. The allocation of the range of motion of the handle (7) to positive or negative can be varied by changing the angle of the fixed links (51) with respect to the cervical vertebra (C7), which is declined 45 degrees in the depicted embodiment. In FIGS. 1, 2, and 3, the handle (7) is pivoted 10 degrees above horizontal to better display features of the head harness (9) and the head harness shaft (10) in FIG. 3.

To prevent the floating links (54) from becoming parallel to or extending to the opposite sides of the long links (53) when the handle (7) is pivoted downwardly, a stop pin (55) is inserted into at least one of the floating links (54). The stop pin (55) engages the respective long link (53) when the handle (7) is pivoted to the extreme of its desired downward range of motion, stopping the floating link (54) from going beyond the long link (53).

The handle (7) is also used to move the movable member (5) right or left about the anteroposterior neck movement axis (coming in and out of point (49) in FIG. 3, which extends along the centerline and pivot axis of the shaft and bearing assembly (12).

Figure 4:
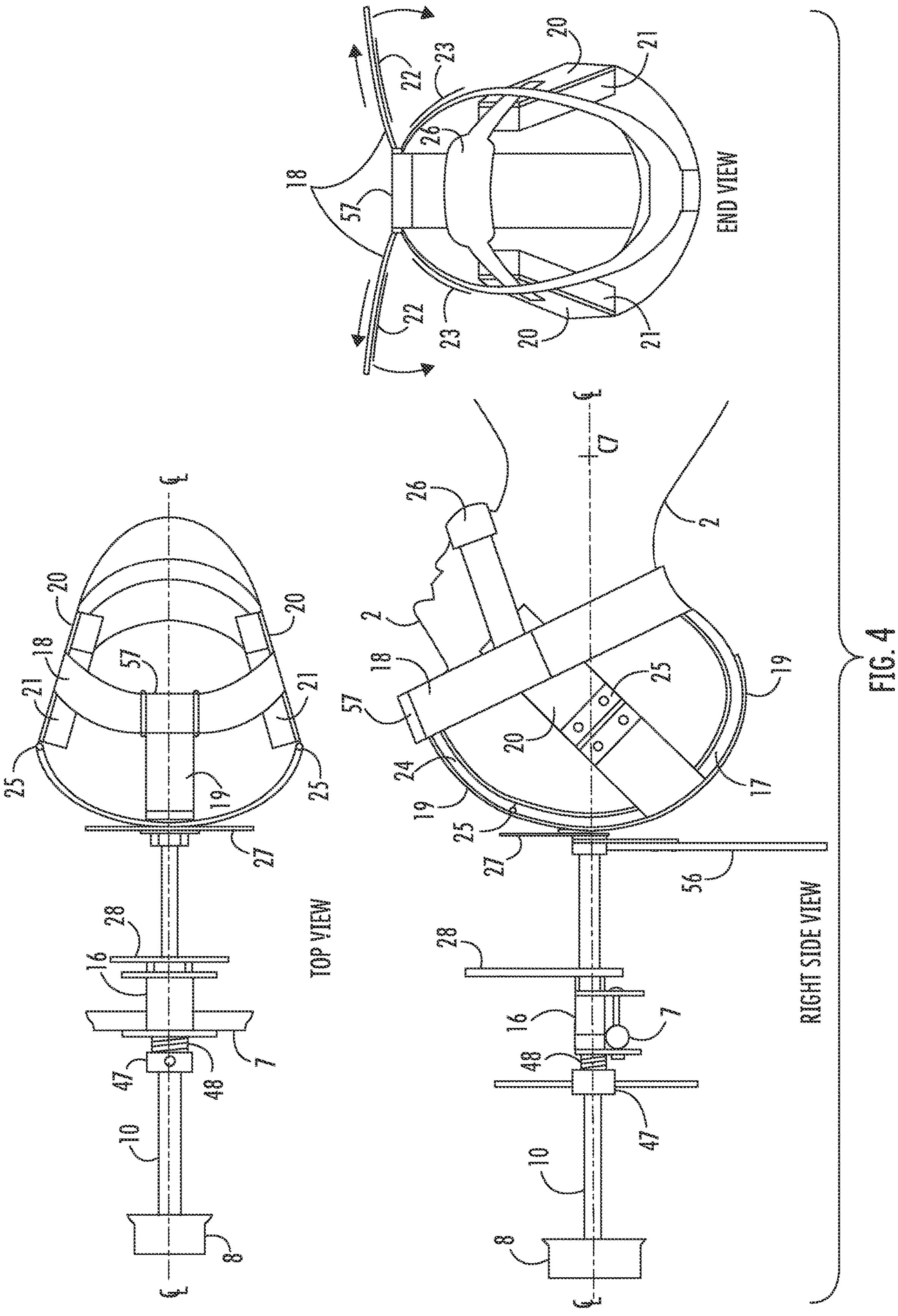
FIG. 4 is a right side view, top view and end view of a head harness and shaft of the device of FIG. 1.

Referring to FIG. 4, a head harness bearing (16) is arranged in the center of the handle (7), through which bearing (16) a head harness shaft (10) pivots not only about the craniocaudal neck movement axis, but also in and out along that axis. The internal end of the head harness shaft (10) is bolted to the head harness (9). On the external end of the head harness shaft (10) is a knob (8), which the therapist uses to rotate the head harness (9) and to move the head harness shaft (10) in or out. The knob (8) can also be used to move the handle (7) right or left and up or down. By way of example, the handle (7) can rotate approximately 30 degrees up and 45 degrees down and approximately 45 degrees left or right. Before the knob (8) can rotate or translate the head harness shaft (10), the head harness shaft (10) must be disengaged from the head harness bearing (16) by rotating a collet nut (47) counterclockwise about the threaded collet (48) relieving the compression of the collet (48) on the head harness shaft (10) and freeing the head harness shaft (10) for movement. The end of the collet (48) is preferably split into four or more segments to allow for its compression. The collet (48) is a fixed part of the head harness bearing (16) which is bolted to the handle (7). To prevent the head harness (9) from turning more than 90 degrees in either direction, a bar (56) is mounted downward on the head harness shaft (10) against the head frame (19). When the head harness shaft (10) is turned too far the bar (56) will act as a rotational stop by contacting the handle (7) and stopping further rotational motion.

The head harness member (9) includes an articulated U-shaped flat bar for a head frame (19), an articulated U-shaped flat bar for a cheek frame (20) and a head strap (18). The front of the head frame (19) is vertical in normal position and covers the forehead of the patient (2) to the eyebrows and in line with the nose. Above the forehead, the head frame (19) is articulated with a hinge (25) allowing the front part of the head frame (19) to adjust for head size. Below the hinge (25) in line with the cervical vertebra (C7) along the craniocaudal neck movement axis, the head harness shaft (10) is attached to the head frame (19). The head frame (19) continues onto the back of the head, following the contour of the head and terminating where the head and neck join.

Attached by a hook and loop fastener or the like to the inward side of the forehead portion of the head frame (19) is a top pad (24) which contacts the forehead of the patient (2), providing comfort. From the hinge (25) downward to the neck on the inward side of the head frame (19), a rear pad (17) is attached by hook and loop fastener providing comfort for the patient.

The cheek frame (20) is joined at a right angle to the head frame (19) below the head harness shaft (10) in the area of the occipital bone and proceeds on a radial that would define the curve of the head frame (19). The cheek frame (20) is articulated on each side by a hinge (25) so that the ends move in or out to accommodate the head size. Cheek pads (21) are attached by hook and loop fastener to the inside of the extended ends of the cheek frame (20) to snugly fit against the cheeks.

Additional top pads (24), rear pads (17) and cheek pads (21) can be attached to accommodate smaller head sizes. Sponge rubber is preferred for the pads, as it has sufficient density and firmness so that the head will not have appreciable relative motion with respect to the head harness (9) when the head is secured within the head harness (9) by the head strap (18).

A D ring pad (57) is attached to the forehead end of the head frame (19) by hook and loop fastener. The center of a head strap (18) is placed under the neck but over the head frame (19) then around the cheek frames (20) up to the D ring pad (57). The D ring pad (57) has a D ring on each side of the head frame (19). With two ends of the head strap (18) at the front, one end is threaded through the D ring on its side and turned back against itself. The other end of the head strap (18) is threaded through the other D ring and turned back against itself. Then the ends of the head strap (18) are pulled away from each other, tightening the head strap (18) around the head. Each end of the head strap (18) is then brought against itself where strap hooks (22) on the ends are meshed with strap loops (23) on the internal strap locking the head strap (18) securely around the head. By pulling the head strap (18) ends away from each other the forces against the head are balanced. A chin strap (26) is placed on the chin and pulled up each side of the face and attached to the cheek frame (20) by hook and loop fasteners. The chin strap (26) is used to secure the head frame (19) in place without putting undue force on the temporomandibular joint (TMJ).

Referring to FIG. 4, an angular rotational gauge (27), such as a protractor, is attached to the head harness shaft (10) at the head frame (19) so that the head harness shaft (10) passes through the center of the gauge (27). An angular rotational indicator window (28) which is made of clear plastic with an inscribed vertical line is attached to the head harness bearing (16) so that the inscribed line passes through the center line of the head harness bearing (16). By viewing the degree markings on the angular rotational gauge (27) through the angular rotational indicator window (28) and aligning its inscribed line with a degree marking on the angular rotational gauge (27), the angular rotation of the head about the craniocaudal neck movement axis can be determined.

Referring again to FIGS. 1, 2 and 3, the horizontal hydraulic cylinder (33) is used to lock the movable member (5) in place. The base of the cylinder is pinned in the cylinder pivot bracket (34) which is fixed on the stationary member (4). The cylinder piston rod clevis is pinned to the piston rod bracket (35) mounted on the movable member (5). The horizontal hydraulic cylinder (33) is a double acting cylinder which allows control of hydraulic fluid in both chambers of the cylinder. The quarter turn ball valves (36) at each port of the horizontal hydraulic cylinder (33) are connected by a valve position rod (37) attached to the lever operating the position of the ball so that the two ball valves (36) are synchronized to be either open or closed. When both ball valves (36) are open, the hydraulic fluid flows through the tubing (38) from one chamber to the other chamber. Because the chambers are different volumes, excess hydraulic fluid can move into the hydraulic oil reservoir (39) or, in the case where additional hydraulic fluid is required, hydraulic fluid can be added to the flow from the hydraulic oil reservoir (39). When both ball valves (36) are closed, the incompressible hydraulic fluid is sealed in both chamber of the cylinder locking the piston in place.

Two handle hydraulic cylinders (40 & 58) are used to lock the handle (7) in place. The base of the cylinder is pinned in a cylinder pivot bracket (41) which is fixed on the movable member (5). The piston rod head (42) is attached to the long link (54) by a shoulder screw allowing the long link (54) to move freely as the piston moves in and out. The handle hydraulic cylinders (40 & 58) are also double acting cylinders with hydraulic fluid in both chambers of the cylinders.

Quarter turn ball valves (43) at each port of the handle hydraulic cylinders (40 & 58) are connected by a valve position rod (44) attached to the lever operating the position of the ball so that the two ball valves (43) are synchronized to be either open or closed. When both ball valves (43) are open, the hydraulic fluid flows through the tubing (45) from one chamber to the other chamber. Because the chambers are different volumes, excess hydraulic fluid can move into the hydraulic oil reservoir (46), or in the case where additional hydraulic fluid is required, hydraulic fluid can be added to the flow from the hydraulic oil reservoir (46). When both ball valves (43) are closed, the incompressible hydraulic fluid is sealed in both chambers of the cylinder locking the piston in place.

The objective of two handle hydraulic cylinders (40 & 58) is to have the perpendicular or tangential force of the piston rod head (42) against the long link (54) for the handle hydraulic cylinder (58) to be at its maximum when the perpendicular force of the piston rod head (42) against the long link (54) for the other handle hydraulic cylinder (40) is at its minimum and vice versa. Said another way, as one cylinder approaches the normal position with the long link (54), the other cylinder moves to a tangential position with the long link (54).

Methods of Use

The height of the treatment table (1) is adjusted to fit a seated therapist. The height of the adjustable support on wheels (11) is adjusted and locked where the height of the back rest (50) is at the top of the treatment table (1) pad. The ends of two elastic straps (3) are attached to the frame of the adjustable support on wheels (11) with S hooks, stretched and attached with S hooks to the table legs (6). The two ball valves (36) are opened by pulling the valve position rod (37) and the movable member (5) is turned to the "zero" position on the horizontal angular gauge (29) indicated by the horizontal angular indicator (30). The two ball valves (36) are closed by pushing the valve position rod (37) which then locks the movable member (5) in the "zero" position. The ball valves (43) that control handle hydraulic cylinders (40 & 58) are unlocked by pulling both valve positioning rods (44) and the handle (7) is turned to the "zero" position on the vertical angular gauge (31), indicated by the line of the vertical angular indicator (32) on the short link (52). The ball valves (43) that control handle hydraulic cylinders (40 & 58) are closed by pushing both valve positioning rods (44) and the handle (7) is locked in the "zero" position. The collet nut (47) is turned counter-clockwise releasing the collet's (48) grip on the head harness shaft (10). The knob (8) is used to pull the head harness shaft (10) as far as possible and turn it to "zero" on the angular rotational gauge (27) indicated by inscribed line on the angular rotational indicator window (28). The patient's (2) head can now be placed in the loose head harness (9).

With the patient (2) on his or her back on the treatment table (1) and the shoulders on the back rest (50), the patient's (2) head is extended into the head harness (9). The neck is positioned so that vertebra C7 is located over the pivot point indicator (49). The therapist may need to place his index finger under the patient's (2) cervical vertebra C7 to align it with the pivot point indicator (49). With the head harness shaft (10) loose in the head harness bearing (16), the knob (8) on the head harness shaft (10) is moved forward to engage the head. As the knob (8) is pushed forward, the cheek frames (20) may need to be held open to allow the head to pass through. The head harness (9) may need adjustment to accept the head width by replacing the cheek pads (21) with either thicker or thinner pads. Also, the head diameter fit may need additional rear pads (17) or top pads (24). With the head harness (9) fitted snugly against the top of the head, the knob (8) is turned to the "zero" position as indicated by angular rotational gauge (27) as read through the angular rotational indicator window (28). The head harness (9) is locked into position by turning the collet nut (47) clockwise tightly squeezing the collet's (48) grip on the head harness shaft (10).

With the patient's (2) head comfortably in the head harness (9), the center of a head strap (18) is placed under the neck but over the head frame (19) then around the cheek frames (20) up to the D ring pad (57). The D ring pad (57) has a D ring on each side of the head frame (19). With two ends of the head strap (18) at the front, one end is threaded through the D ring on its side and turned back against itself. The other end of the head strap (18) is threaded through the other D ring and turned back against itself. Then the ends of the head strap (18) are pulled away from each other tightening the head strap (18) around the head. Each end of the head strap (18) is then brought against itself where strap hooks (22) on the ends are meshed with strap loops (23) on the internal strap locking the head strap (18) securely around the head. By pulling the head strap (18) ends away from each other the forces against the head are balanced. A chin strap (26) is placed on the chin and pulled up each side of the face and attached to the cheek frame (20) by hook and loop fasteners. The chin strap (26) is used to secure the head frame (19) in place. The knob (8) is use to "zero" the head rotation by turning the knob (8) where the angular rotational indicator window (28) inscribed line is aligned with zero on the angular rotational gauge (27). The head harness shaft (10) is locked by turning the collet nut (47) clockwise, closing the collet (48) against the shaft.

The therapist is now ready to start the PNF procedures. Initial range of motion angles are measured. With the seated therapist facing the patient's (2) head and the knob (8) in hand, the movable member (5) is unlocked by pulling valve position rod (37) and opening a pair of ball valves (36) to allow hydraulic oil to move freely to the horizontal hydraulic cylinder (33). The movable member (5) can now be moved right using either the handle (7) or the knob (8).

The therapist passively stretches the muscle group to the end of its current range of motion where the right horizontal angular displacement is read by looking down at the horizontal angular indicator (30), showing the degrees moved right from the center line about the anteroposterior neck movement axis on the horizontal angular gauge (29). The degree value is recorded as right lateral flex. The handle (7) is moved to the left passively stretching the muscle group to the end of its current range of motion where the left horizontal angular displacement is read by looking down at the horizontal angular indicator (30), showing the degrees moved left from the center line about the anteroposterior neck movement axis on the horizontal angular gauge (29). The degree value is recorded as left lateral flex. The handle (7) is returned to the "zero" position as shown on the horizontal angular gauge (29). The handle (7) is now locked in horizontal position by pushing the valve position rod (37) and closing the ball valves (36).

For testing movement about the mediolateral neck movement axis, the head harness shaft (10) must be freed by unlocking the collet nut (47), allowing the head harness shaft (10) to both rotate and move in and out. The handle hydraulic cylinders (40 & 58) are unlocked by pulling both valve position rods (44) and opening all associated ball valves (43), freeing vertical movement. While lifting the handle (7) up, the therapist pulls the knob (8) allowing the handle (7) to translate toward (C7) while the head moves in an arc about the mediolateral neck movement axis. The therapist continues to move the handle (7) while pulling the knob (8) as the head naturally moves out in the handle (7), passively stretching the muscle group to the end of its current range of motion. The position is locked in by pushing both valve position rods (44). The vertical angular indicator (32) is observed on the vertical angular gauge (31) and the anterior flex extension is recorded.

The handle hydraulic cylinders (40 & 58) are unlocked by pulling both valve position rods (44) and moving the handle (7) down while pushing the knob (8) in, stretching the muscle group to its current range of motion downwardly about the mediolateral neck movement axis. The position is locked in by pushing both valve position rods (44). The vertical angular indicator (32) is observed on the vertical angular gauge (31) and recorded on the patient's chart as posterior flex extension. Both handle hydraulic cylinders (40& 58) are unlocked and the handle (7) is returned to zero. The handle hydraulic cylinders (40 & 58) are locked in position by pushing both valve position rods (44). The head harness shaft (10) remains loose.

For head rotation, the knob (8) is turned to the right about the craniocaudal neck movement axis to passively stretch the muscle group to its current range of motion and the collet nut (47) is tightened clockwise. The degree on the angular rotational gauge (27) is read through the angular rotational indicator window (28) and recorded on the patient's chart as rotation right. The collet nut (47) is unlocked and the knob (8) is turned left about the craniocaudal neck movement axis to the current range of motion. The collet nut (47) is locked and the degree is read on the angular rotational gauge (27) through the angular rotational indicator window (28) and recorded on the patient's chart as rotation left. The collet nut (47) is unlocked and returned to "zero" and then relocked The head is now locked in its initial position. There are now six initial angular displacement values in degrees recorded on the patient's chart.

After the initial condition of neck movement is recorded, the horizontal valve position rod (37) is pulled and the handle (7) is moved right, where the therapist passively stretches the muscle group to the end of its current range of motion. The horizontal valve position rod (37) is pushed locking the horizontal hydraulic cylinder (33). The patient then contracts the muscle group isometrically in the stretched position against resistance of the head harness (9) (push head left) for ten to fifteen seconds, timed by the therapist. The muscle group is then allowed to relax. The therapist may need to assist by holding the knob (8) steady to keep the head harness (9) in position.

The horizontal valve position rod (37) is pulled and the handle (7) is moved right as the therapist passively stretches the muscle group to the end of its increased range of motion. The horizontal valve position rod (37) is pushed locking the horizontal hydraulic cylinder (33). Again the muscles are contracted isometrically in the stretched position against resistance of the head harness (9). This routine continues until no further range of motion is achieved or the patient becomes fatigued. The horizontal valve position rod (37) is pulled and the handle (7) is moved left as the therapist passively stretches the muscle group to the end of its range of motion. The above procedure is repeated for the left side pushing the head to the right, again until no further range of motion is achieved or the patient becomes fatigued. The horizontal valve position rod (37) is then pulled and the handle (7) is returned to its "zero" position, where it is locked by pushing the horizontal valve position rod (37).

For repeating this procedure for vertical movement, the head harness shaft (10) is freed by unlocking the collet nut (47), allowing the head harness shaft (10) to both rotate and move in and out. The handle hydraulic cylinders (40 & 58) are unlocked by pulling both valve position rods (44). The knob (8) is used to move the handle (7) up and assist the head harness shaft (10) to move out, passively stretching the muscle group upward to the end of its current range of motion. The vertical hydraulic cylinders (40 & 58) are locked by pushing both valve position rods (44). The patient contracts the muscle group isometrically in the stretched position (push back) against resistance of the head harness (9) for ten to fifteen seconds timed by the therapist. The muscle group is then allowed to relax before the vertical hydraulic cylinders (40 & 58) are released and the head is moved further up to an increased range of motion where the vertical hydraulic cylinders (40 & 58) are locked. The muscles are again contracted isometrically in the stretched position against resistance of the head harness (9). This routine continues until no further range of motion is achieved or the patient becomes fatigued.

The vertical hydraulic cylinders (40 & 58) are unlocked by pulling both valve position rods (44). Using the knob (8) to move the handle (7) down and assist the head harness shaft (10) to move in, the muscle group is passively stretched to the end of its current range of motion and the above procedure is repeated for head push up until no further range of motion is achieved or the patient becomes fatigued. The vertical hydraulic cylinders (40 & 58) are unlocked and returned to "zero." The cylinders (40 & 58) are re-locked by pushing both valve position rods (44).

At this point the head harness shaft (10) is still free. The therapist turns the knob (8) to the left and passively stretching the muscle group to the end of its current range of motion. The collet nut (47) is tightened clockwise. The patient contracts the muscle group isometrically in the stretched position by rotating the head to the right against resistance of the head harness (9) for ten to fifteen seconds timed by the therapist. The muscle group is then allowed to relax before the collet nut (47) is released and the head is rotated further to the left to an increased range of motion where the collet nut (47) is locked. The muscles are again contracted isometrically in the stretched position against resistance of the head harness (9). This routine continues until no further range of motion is achieved or the patient becomes fatigued. This procedure is then repeated in the other direction by turning the knob to the right and pressing the head to the left, again until no further range of motion is achieved or the patient becomes fatigued. The collet nut (47) is turned counter clockwise, releasing the collet's (48) grip on the head harness shaft (10). The head is rotated to the left to the "zero" position where the collet nut (47) is tightened.

This sequence may be continued for the head placed at compound angles as the therapist deems necessary. After active therapy is completed, final measurement of the improved range of motion must be made by repeating the procedure used to measure initial range of motion angles as explained above. The results of these final measurements will be recorded for final right lateral flex, left lateral flex, anterior flex extension, posterior flex extension, left rotation, and right rotation. These results compared to the initial measurements will show improved range of motion.

An alternative use of this device is as a therapeutic device for holding the head in a secure fixed position while the therapist applies therapy to the neck with both hands, or with one hand while resting the other. The exact position of the head can be recorded using the angular measuring means.

The neck is a very complex biological mechanism, having multiple joints with complex interactions. Generally speaking, however, the neck can be understood to allow rotational movement about three axes: the anteroposterior (front-to-back) axis, the mediolateral (side-to-side) axis, and the craniocaudal (top-to-bottom) axis. Similarly, the anteroposterior and mediolateral axes can be considered to define the transverse plane, the anteroposterior and craniocaudal axes can be considered to define the sagittal plane (i.e., the midsagittal plane), and the mediolateral and craniocaudal axes can be considered to define a coronal plane. Although the neck is not a single joint, cervical vertebra C7 can be said to be the intersection of the above three identified neck movement directions. Advantageously, the three pivot axes defined by the present device also effectively intersect at the cervical vertebra C7. This improvement also made possible a more positive locking arrangement using two complementary hydraulic cylinders in which, as one cylinder becomes more normal to the long link of the four-bar linkage, the other cylinder will become more tangential to the long link.

It will be appreciated by those skilled in the art that many modifications and embodiments of the above-described invention will come to the mind of one skilled in the art having the benefit of the teachings presented in the forgoing description and the associated drawings. Therefore, it is to be understood that the invention is not to be limited to the specific embodiment disclosed herein, and that modifications and alternate embodiments are intended to be included within the scope of this invention.

What is claimed is:

1. A neck movement support device comprising:

a stationary member;

a movable member mounted to the stationary member at a first pivot point, the movable member being rotatable relative to the stationary member about the first pivot point, the first pivot point defining an anteroposterior neck movement axis;

a handle connected to the movable member by a pair of four-bar linkages so as to approximate rotation about a second pivot point defining a mediolateral neck movement axis perpendicular to and intersecting the anteroposterior neck movement axis; and a head harness connected to the handle at a third pivot point, the head harness being rotatable relative to the handle about the third pivot point, the third pivot point defining a craniocaudal neck movement axis perpendicular to both the anteroposterior and mediolateral neck movement axes and sharing a mutual intersection therewith;

wherein, with the stationary member positioned adjacent a treatment table and configured to hold a supine user, in which a head of the user is configured to be secured in the head harness that is configured to constrain the head to move or remain stationary along with the head harness about the anteroposterior, mediolateral and craniocaudal neck movement axes defined by the device, with the mutual intersection being located at cervical vertebra C7 of the user.

2. The device of claim 1, further comprising a height-adjustable support on wheels on which the stationary member is mounted.

3. The device of claim 1, further comprising at least one elastic strap connectable between the height-adjustable support and legs of the treatment table.

4. The device of claim 1, further comprising a back rest mounted on the stationary member for positioning co-planar with an upper surface of the treatment table.

5. The device of claim 4, wherein engagement with the back rest delimits the rotational movement of the movable member about the anteroposterior neck movement axis to approximately 45 degrees in opposite directions.

6. The device of claim 1, wherein the movable member is mounted to the stationary member by a shaft and bearing assembly.

7. The device of claim 1, wherein each of the four-bar linkages includes:

a fixed link on the movable member;

a floating link on the handle;

a short link extending between first ends of the fixed and floating links; and a long link extending between second ends of the fixed and floating links further from the mutual intersection than the short link.

8. The device of claim 7, wherein a sum of lengths of the short and floating links equals a sum of lengths of the fixed and long links.

9. The device of claim 7, wherein the fixed link of each of the four-bar linkages is formed integrally within a respective handle support of the movable member and the floating link of each of the four-bar linkages is formally integrally within a respective side of the handle.

10. The device of claim 7, wherein a plane defined by the floating links deviates no further than 0.589 inches from the mutual intersection throughout a range of motion delimited by the handle about the mediolateral neck movement axis.

11. The device of claim 10, wherein the range of motion delimited by the handle about the mediolateral neck movement axis is 75 degrees.

12. The device of claim 11, wherein 30 degrees of the range of motion delimited by the handle about the mediolateral neck movement axis is allocated to movement above horizontal and 45 degrees is allocated to movement below horizontal.

13. The device of claim 12, wherein allocation of the range of motion of the handle is variable by changing an angle of the fixed links with respect to horizontal.

14. The device of claim 7, wherein at least one of the floating links includes a stop pin that engages a respective one of the long links at a downward end of the range of motion delimited by the handle about the mediolateral neck movement axis, preventing the floating link from passing beyond the long link.

15. The device of claim 1, wherein the head harness is connected to the handle by a head harness shaft and bearing also configured to translate the head harness relative to the handle along the craniocaudal neck movement axis.

16. The device of claim 1, wherein the head harness includes a first U-shaped bar configured extend from a forehead of the user over a top of the head of the user to a back of a neck of the user.

17. The device of claim 16, wherein the head harness further includes a second U-shaped bar attached perpendicularly to the first-U-shaped bar and configured to extend up opposite sides of the head of the user from an area of the occipital bone.

18. The device of claim 16, wherein the head harness further includes at least one head strap attached to the first U-shaped bar.

19. The device of claim 1, further comprising at least one of:

first rotational measurement gauge configured to indicate movement about the anteroposterior neck movement axis;

a second rotational measurement gauge configured to indicate movement about the mediolateral neck movement axis; and a third rotational measurement gauge configured to indicate movement about the craniocaudal neck movement axis.

20. The device of claim 19, further comprising the first, second and third rotational measurement gauges.

21. The device of claim 1, further comprising at least one of:

a first hydraulic lock configured to prevent movement about the anteroposterior neck movement axis;

a second hydraulic lock configured to prevent movement about the mediolateral neck movement axis; and a mechanical lock configured to prevent movement about the craniocaudal neck movement axis.

22. The device of claim 21, further comprising the first and second hydraulic locks, and the mechanical lock.

23. The device of claim 21, wherein the device comprises at least the second hydraulic lock;

wherein each of the four-bar linkages includes:

a fixed link on the movable member;

a floating link on the handle;

a short link extending between first ends of the fixed and floating links; and a long link extending between second ends of the fixed and floating links further from the mutual intersection than the short link; and wherein the second hydraulic lock includes:

a first handle hydraulic cylinder having a first cylinder first end pivotably connected to the movable member and a first cylinder second end pivotably connected to one of the long links further from the mutual intersection than the first cylinder first end; and a second handle hydraulic cylinder having a second cylinder first end pivotably connected to the movable member and second cylinder second end pivotably connected to one of the long links closer to the mutual intersection than the second cylinder first end.

24. The device of claim 23, wherein the first and second cylinder second ends are connected to their respective long links on opposite sides of the handle.

25. A method of using the neck movement support device of claim 1 in proprioceptive neuromuscular facilitation (PNF) therapy, the method comprising:

securing the head of the user in the head harness with the user in the supine position; and moving the head harness to move a neck of the user about at least one of the anteroposterior, mediolateral and craniocaudal neck movement axes.

26. The method of claim 25, further comprising at least one of:

holding the head in a fixed position during neck therapy;

measuring a range of motion of the head and neck; and measuring applied forces of the head against the head harness.

* * * * *